United States Patent
Fan et al.

(10) Patent No.: US 9,455,623 B2
(45) Date of Patent: Sep. 27, 2016

(54) POWER FACTOR CORRECTION CIRCUIT AND METHOD

(71) Applicant: Infineon Technologies Austria AG, Villach (AT)

(72) Inventors: Lim Shu Fan, Singapore (SG); Martin Krueger, Munich (DE)

(73) Assignee: Infineon Technologies Austria AG, Villach (AT)

( * ) Notice: Subject to any disclaimer, the term of this patent is extended or adjusted under 35 U.S.C. 154(b) by 263 days.

(21) Appl. No.: 13/970,414

(22) Filed: Aug. 19, 2013

(65) Prior Publication Data

US 2015/0048807 A1    Feb. 19, 2015

(51) Int. Cl.
  *H02M 1/42*    (2007.01)
  *H02M 3/156*   (2006.01)
  *H02M 7/48*    (2007.01)

(52) U.S. Cl.
  CPC .............. *H02M 1/42* (2013.01); *H02M 1/4225* (2013.01); *Y02B 70/126* (2013.01)

(58) Field of Classification Search
  CPC ..... Y02B 70/12; Y02B 70/126; H02M 1/42; H02M 1/4208; H02M 1/4225; H02M 1/4241; H02M 7/42; H02M 7/48; H02M 3/156
  USPC .................................... 363/89; 323/205, 207
  See application file for complete search history.

(56) References Cited

U.S. PATENT DOCUMENTS

| 4,683,529 A * | 7/1987 | Bucher, II | H02M 1/4225 323/207 |
| 6,341,073 B1 * | 1/2002 | Lee | 363/21.02 |
| 8,098,506 B2 * | 1/2012 | Saint-Pierre | 363/97 |
| 2011/0261599 A1 | 10/2011 | Duerbaum et al. | |
| 2013/0121049 A1 * | 5/2013 | Shi et al. | 363/89 |

(Continued)

FOREIGN PATENT DOCUMENTS

| CN | 101741244 A | 6/2010 |
| CN | 101908829 A | 12/2010 |

(Continued)

OTHER PUBLICATIONS

Kang et al., "On-line efficiency optimization in flyback dc-dc converters over wide ranges of operating conditions", Applied Power Electronics Conference and Exposition (APEC), 2011 Twenty-Sixth Annual IEEE, 1417-1424.*

(Continued)

*Primary Examiner* — Gary L Laxton
(74) *Attorney, Agent, or Firm* — Slater Matsil, LLP (57) ABSTRACT

A power factor correction (PFC) circuit includes a first inductor, which is operably supplied with an input voltage and an input current. The input voltage is a rectified AC line voltage. A semiconductor switch has a load current path coupled in series with the first inductor. An output terminal is coupled to the inductor and operably providing an output voltage and an output current. A controller circuit controls the cyclic switching operation of the semiconductor switch. The controller circuit is configured to monitor a feedback signal representing the voltage drop across the load current path of the semiconductor switch, to detect at least one local minimum in the feedback signal while the semiconductor switch is off, and to switch on the semiconductor switch in response to detecting the N-th local minimum in the feedback signal.

24 Claims, 3 Drawing Sheets

(56) References Cited

U.S. PATENT DOCUMENTS

2015/0323949 A1 11/2015 Saint-Pierre
2016/0118901 A1 4/2016 Saint-Pierre, Jr.

FOREIGN PATENT DOCUMENTS

CN 102118107 A 7/2011
CN 103117655 A 5/2013

OTHER PUBLICATIONS

"AN-6921 Integrated Critical Mode PFC/Quasi-Resonant Current Mode PWM Controller FAN6921," Fairchild Semiconductor Corporation, Rev. 1.0.1, Aug. 24, 2010, 16 pages.
Erickson, R.W., et al., "Fundamentals of Power Electronics," Springer, 2nd Edition, Jan. 31, 2001, pp. 609-701.
Frank, W., "TDA 4863—Technical Description AN-PFC-TDA 4863-1," Power Management & Supply, Infineon Technologies AG, version 1.2, Oct. 29, 2003, 27 pages.
Lai, Z., et al., "Time Quantity One-Cycle Control for Power-Factor Correctors," IEEE Transactions on Power Electronics, vol. 12, No. 2, Mar. 1997, pp. 369-375.
Lazar, J., "Open Loop Control of a Unity Power Factor, Discontiuous Conduction Mode Boost Rectifier," 17th International Telecommunications Energy Conference, INTELEC '95, Oct. 29, 1995-Nov. 1, 1995, pp. 671-677.
Lazar, J., et al., "Feedback Loop Analysis for AC/DC Rectifiers Operating in Discontinous Conduction Mode," Applied Power Electronics Conference and Exposition, APEC '96, vol. 2, Mar. 3-7, 1996, pp. 797-806.
"TEA1716T—Resonant power supply control IC with PFC," NXP Semiconductors, Rev. 2, Aug. 21, 2012, 47 pages.
"NCP1605, NCP1605A, NCP1605B—Enhanced High Voltage and Efficient Standby Mode, Power Factor Controller," ON Semiconductor, Rev. 10, Apr. 2012, 32 pages.
Rossetto, L., et al., "Control Techniques for Power Factor Correction Converters," Proc. Power Electronics and Motion Control Conference, Sep. 1994, 9 pages.
Ye, Z, et al., "Digital Implementation of a Unity-Power-Factor Constant-Frequency DCM Boost Converter," Applied Power Electronics Conference and Exposition, Twentieth Annual IEEE, vol. 2, Mar. 6-10, 2005, pp. 818-824.
Ye, Z., et al., "Implementation and Performance Evaluation of DSP-Based Control for Constant-Frequency Discontinuous-Conduction-Mode Boost PFC Front End," IEEE Transactions on Industrial Electronics, vol. 52, No. 1, Feb. 2005, pp. 98,107.

\* cited by examiner

POWER FACTOR CORRECTION CIRCUIT AND METHOD

TECHNICAL FIELD

The present disclosure relates to power factor correction circuit and a corresponding method. Power factor correction is usually applied in switched mode power supplies for ensuring a high power factor.

BACKGROUND

Switched mode power supplies (SMPS) are becoming increasingly common as power supplies for a great variety of applications. For example, SMPS may be used as power supplies for driving LEDs, which may be used to replace incandescent lamps for illumination purposes. However, many other applications for switching power converters exist as practically any electric and electronic device which requires a DC power supply voltage (or current) can be connected to the power grid using SMPS.

LEDs are a type of semiconductor devices that require direct current (DC) for operation. Since the electrical power grid delivers alternating current (AC), a line-powered device must convert the AC to DC in order to power the LEDs. Another increasingly common requirement for line-operated equipment is power factor correction (PFC, also referred to as "power factor control"). Devices which are capable of power factor correction are able to maximize the efficiency of the power grid by making the load "seen" by the power grid appear (approximately) purely resistive thus minimizing the reactive power. The high power factor of resistive loads arises from the unvarying proportionality between the instantaneous voltage and the instantaneous current, i.e., the phase lag between the alternating input voltage and the corresponding alternating input current is approximately zero (and thus the cosine of the phase lag approximately unity).

Usually, PFC circuits form the input stage of a SMPS and are thus coupled between the rectifier (which is present in most SMPS supplied by the AC power grid) and the output stage that is usually a step-down switching power converter (e.g., a buck converter, a resonant converter, or a flyback-converter). The PFC circuit (also referred to as PFC stage of the SMPS) is usually also a switching power converter (e.g., a flyback converter or a boost converter, also referred to as step-up converter). However, the switching operation of the PFC stage is controlled such that the input current follows, on average, the input voltage without (or with a comparably small) phase lag.

PFC circuits may be controlled to perform a quasi-resonant switching. That is, the switching frequency is not defined by a clock. At a given root-mean-square input voltage and at constant load, the switching frequency varies periodically with the double ac line frequency. Furthermore, the frequency range may vary dependent on the electrical load supplied by the SMPS and/or dependent on the input voltage applied to the PFC circuit. Modern SMPS are often designed to cope with a wide range of input voltages and/or with a wide range of electrical loads. As a result the switching frequency of the PFC circuit also varies within a relatively wide frequency range. The switching frequency may assume undesired high values.

SUMMARY OF THE INVENTION

A power factor correction (PFC) circuit is described herein. In accordance with a first example of the present invention the PFC circuit includes a first inductor, which is operably supplied with an input voltage and an input current. The input voltage is a rectified AC line voltage. The PFC circuit further includes a semiconductor switch that has a load current path coupled in series to the first inductor. An output terminal is coupled to the inductor and operably providing an output voltage and an output current. Moreover, the PFC circuit further includes a controller circuit for controlling the cyclic switching operation of the semiconductor switch. The controller circuit is configured to monitor a feedback signal representing the voltage drop across the load current path of the semiconductor switch, to detect at least one local minimum in the feedback signal while the semi-conductor switch is off, and to switch on the semiconductor switch in response to detecting the N-th local minimum in the feedback signal. Thereby, N is an integer number equal to or greater than 1 and determined dependent on at least one of the following: the input voltage, the output voltage, and the output current. The controller circuit is further configured to switch off the semiconductor switch after an adjustable on-time has elapsed.

Furthermore, a power factor correction method is disclosed which males use of a PFC circuit including a first inductor operably supplied with an input voltage and an input current, wherein the input voltage is a rectified AC line voltage. The PFC circuit further includes a semiconductor switch having a load current path coupled in series to the first inductor, and an output terminal coupled to the inductor and operably providing an output voltage and an output current. In accordance with one example of the invention the method includes the monitoring of a feedback signal representing the voltage drop across the load current path of the semiconductor switch, wherein at least one local minimum in the feedback signal is detected while the semiconductor switch is off. The semiconductor switch is switched on in response to the detection of the N-th local minimum in the feedback signal, wherein N is an integer number equal to or greater than 1 and determined dependent on at least one of the following: the input voltage, the output voltage, and the output current. The semiconductor switch is switched on after an adjustable on-time has elapsed.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION OF ILLUSTRATIVE EMBODIMENTS

The following description relates to one illustrative application of a power factor control (PFC) circuit in accordance with one example of the invention. The described application is a switched mode power supply (SMPS) circuit composed of a rectifier stage, a PFC stage and, as output stage, a switching converter stage (e.g., a boost or a flyback converter). It should be noted that the described SMPS circuit is merely an exemplary application for PFC circuits designed in accordance with the present invention, and in fact the PFC circuits in accordance with the present invention may be readily applied in other types of power supply circuit. For example, some switched mode power supply circuits do not use a diode bridge as rectifier. Moreover, the output stage does not necessarily have to include a flyback converter and other types of switching converter topologies (e.g., a resonant converter or a buck converter) may be used in the output stage. The exemplary PFC circuits described herein facilitate low switching losses and low electromagnetic interferences (EMI) by forcing the switching frequency to stay within a defined frequency range while the load of the SMPS circuit or the input voltage (or both) may vary within a comparably wide range.

As mentioned above, the SMPS circuit of FIG. 1 includes a rectifier stage, a PFC stage and an output stage. In the present example the rectifier stage is a simple bridge rectifier 1 composed of four rectifier diodes. The rectifier 1 is supplied with a sinusoid AC line voltage $V_{AC}$ and provides a corresponding full-wave rectified input voltage $v_G$, which is a DC voltage with respect to a reference potential (e.g., ground potential provided at a ground terminal GND) having a full-wave rectified sine waveform. The input voltage $v_G$ is supplied to the circuit forming the PFC stage 2 (PFC circuit), which is designed to ensure that the resulting input current $i_L$ is, on average, at least approximately proportional and in-phase with the input voltage $v_G$. If this is the case, then the line current $i_{AC}$ drawn by the rectifier 1 is also proportional and in-phase with the AC line voltage $V_{AC}$ (which is equivalent with a high power factor of nearly 1). In practice, power factors higher than 0.95 are a typical design goal. The principle of power factor control in switched mode power supplies is discussed later in more detail with reference to FIG. 3.

In essence, the PFC circuit 2 is a switching converter using a specific control scheme. In the present example of FIG. 1 the PFC circuit 2 makes use of a boost converter topology. However, other switching converter topologies (e.g., a flyback converter) may also be applicable. Accordingly, the PFC circuit 2 includes an inductor $L_{PFC}$, a power semiconductor switch $Q_{PFC}$ (e.g., a MOS transistor), a diode $D_{PFC}$, an output capacitor $C_{PFC}$ as well as a controller circuit 4 which controls the switching operation of the PFC circuit 2 and may also control the operation of the subsequent output stage 3, whose output is operably connected to the load (symbolized in FIG. 1 by a resistor $R_{LOAD}$) to supply the load with a regulated supply voltage $V_{OUT}$ or supply current $i_{OUT}$.

In accordance with the mentioned boost converter topology the inductor $L_{PFC}$ is connected in series with the load current path (e.g., drain-source path) of the power semiconductor switch $Q_{PFC}$. This series circuit of inductor $L_{PFC}$ and power semiconductor switch $Q_{PFC}$ is connected between an input circuit node of the PFC circuit 2 and ground terminal GND, such that the input voltage $v_G$ is applied across the mentioned series circuit. The common circuit node of inductor $L_{PFC}$ and power semiconductor switch $Q_{PFC}$ is connected to an output circuit node of the PFC circuit 2 via the diode $D_{PFC}$, and the output capacitor $C_{PFC}$ is connected between that output circuit node and ground potential (ground terminal GND). Thus, the capacitor $C_{PFC}$ is charged via the inductor $L_{PFC}$ and the diode $D_{PFC}$ while the power semiconductor switch $Q_{PFC}$ is off (i.e., no current path is provided between drain and source of the semiconductor switch $Q_{PFC}$). The capacitor $C_{PFC}$ is discharged via the output stage 3 while the power semiconductor switch $Q_{PFC}$ is on and the diode $D_{PFC}$ is thus reverse biased and blocking. The controller circuit 4 is configured to generate a drive signal (e.g., a gate signal $V_G$ in case of a MOS transistor) for the power semiconductor switch $Q_{PFC}$. For generating the drive signal $V_G$ the controller circuit 4 may use some measured signals occurring in the PFC circuit 2, particularly a current sense signal $V_{CS}$ representing the transistor current $i_{DS}$ (e.g., drain-source current in case of a MOS transistor) or the inductor current $i_L$. Additionally a measured signal representing the output voltage $v_O$ of the PFC circuit 2 may be used. It should be noted, that the diode $D_{PFC}$ could also be replaced by a second transistor. The switching operation of the power semiconductors switch $Q_{PFC}$ (i.e., the function of the PFC stage 2) is further discussed in more detail with reference to FIG. 2.

Figure 1:
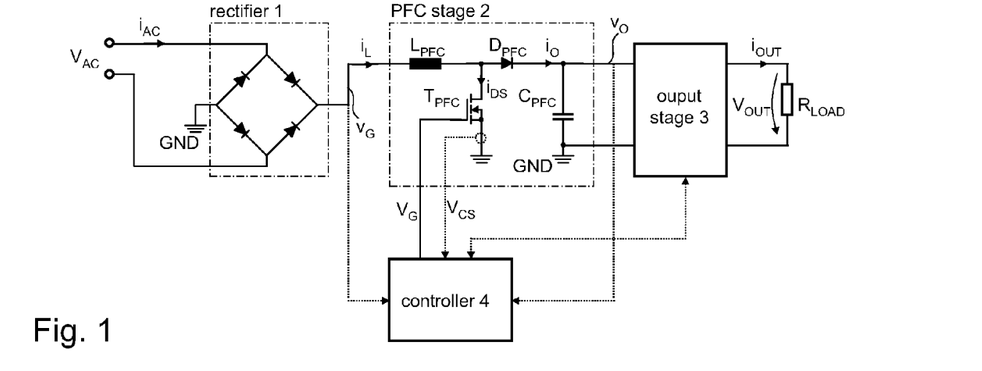
FIG. 1 illustrates one exemplary switched mode power supply (SMPS) circuit including a rectifier stage, a power factor control (PFC) stage, and a switching converter stage (output stage)
Figure 2:
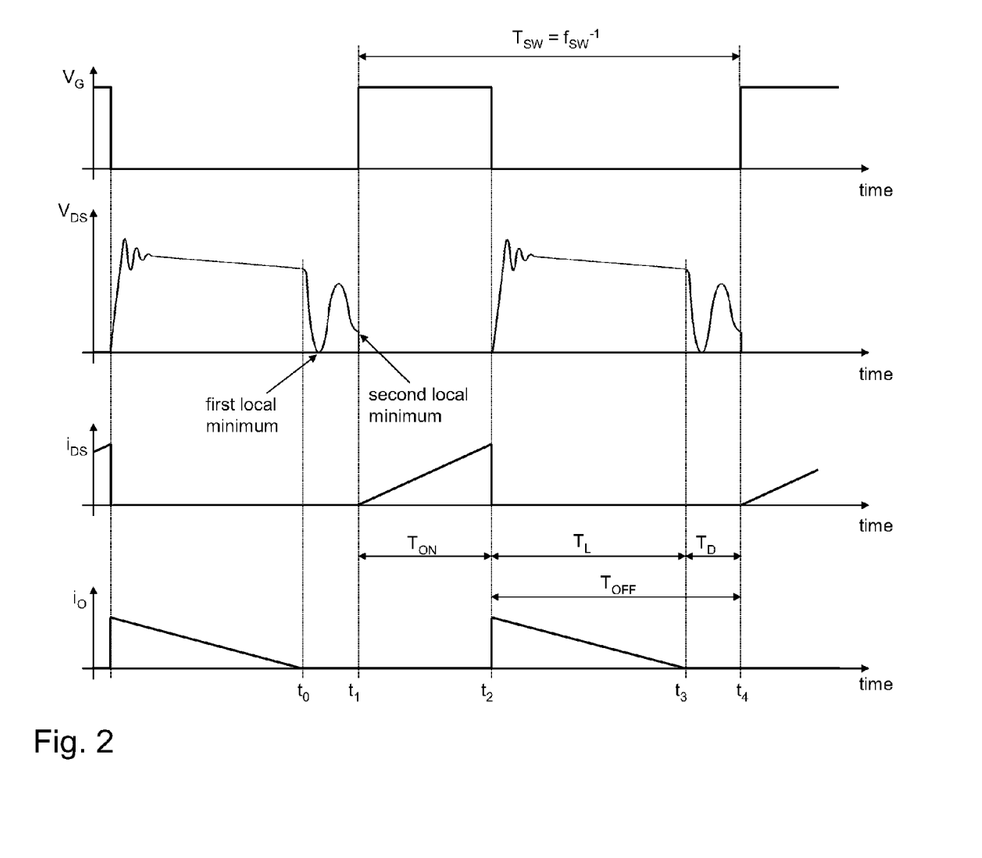
FIG. 2 includes timing diagrams illustrating waveforms of various signals relevant for the operation of the PFC circuit of FIG. 1.

The boost converter included in the PFC state 2 operates in discontinuous current mode (DCM) which is well known in the field of switching converters. In DCM, the output current $i_O$ (which equals the inductor current $i_L$ during time periods in which the semiconductor switch $Q_{PFC}$ is off) drops to zero and remains zero for at least a short delay time. This definition distinguishes DCM from continuous current mode (CCM) in which the inductor current $i_L$ would not drop to zero during a switching cycle. FIG. 2 includes four timing diagrams illustrating the drive signal $V_G$ (gate signal) supplied to the semiconductor switch $Q_{PFC}$, the corresponding voltage drop $V_{DS}$ across the load current-path (drain-source current-path) of the semiconductor switch $Q_{PFC}$, as well as the resulting currents $i_{DS}$ and $i_O$ passing through the switch $Q_{PFC}$ (for energizing the inductor $L_{PFC}$) and, respectively, through the diode $D_{PFC}$ (for charging the output capacitor and supplying the load). The inductor current $i_L$ is a superposition of the currents $i_{DS}$ and $i_O$. The switching period, i.e., the duration of one switching cycle, is denoted with $T_{SW}$ and equals (per definition) $f_{SW}^{-1}$. The switching period can be divided into an on-time $T_{ON}$ and an off-time $T_{OFF}$, wherein the off-time $T_{OFF}$ can be, again, divided into a fall time $T_L$ (the time the output current $i_O$ needs for dropping from its maximum value to zero) and a subsequent delay time $T_D$ (during which the current $i_O$ remains zero). For the following discussion it is assumed that the on-time $T_{ON}$ is determined by the controller 4.

The drive signal $V_G$ is set to a high level at time instant $t_1$ so as to switch on the semiconductor switch $Q_{PFC}$. The criterion according to which the switch-on times $t_1$, $t_4$, etc. are determined will be discussed later. As a response to the rising edge in the drive signal $V_G$ the semiconductor switch $Q_{PFC}$ is switched on. That is, the voltage drop $V_{DS}$ across the semiconductor switch $Q_{PFC}$ drops to (almost) zero, and the current $i_{DS}$ passing through the switch (and the inductor) starts to rise approximately linearly starting from zero. The output current $i_O$ is zero during the on-time $T_{ON}$ as the diode $D_{PFC}$ is reverse biased an blocking.

After the desired on-time $T_{ON}$ has elapsed at time instant $t_2$ ($t_2=t_1+T_{ON}$) the drive signal $V_G$ is reset to a low level; and the semiconductor switch is switched off as a response to a falling edge in the drive signal at time instant $t_2$. That is, the voltage drop $V_{DS}$ across the semiconductor switch $Q_{PFC}$ rises to an (almost) constant high level (after some ringing), and the current $i_{DS}$ passing through the switch (and the inductor) falls abruptly to zero as the diode $D_{PFC}$ becomes conductive. The inductor current $i_L$ is (metaphorically speaking) handed over from the transistor's load-current path to the diode's load current path. As a consequence the output current $i_O$ abruptly rises at time instant $t_2$ from zero to its maximum (which is almost equal to the maximum of the current $i_{DS}$ mentioned above).

Subsequently, the output current passing through the diode $D_{PFC}$ (and through the inductor) drops (almost) linearly until it reaches zero at time instant $t_3$ ($t_3=t_2+T_L$). At this time instant the voltage $V_{DS}$ starts oscillating while the output current (and thus the inductor current) remains zero. The first minimum of this oscillating voltage is (ideally) at zero volts. The amplitude of the oscillation then gradually decays. In the present example, the drive signal is again set to a high level at time instant $t_4$ to switch on the semiconductor switch $Q_{PFC}$, and thus the next switching cycle starts over. The time instant $t_4$ is determined as the time instant at which the oscillating voltage $V_{DS}$ across the semiconductor switch reaches a local minimum. In the present example the second local minimum of the oscillation is selected.

Figure 3:
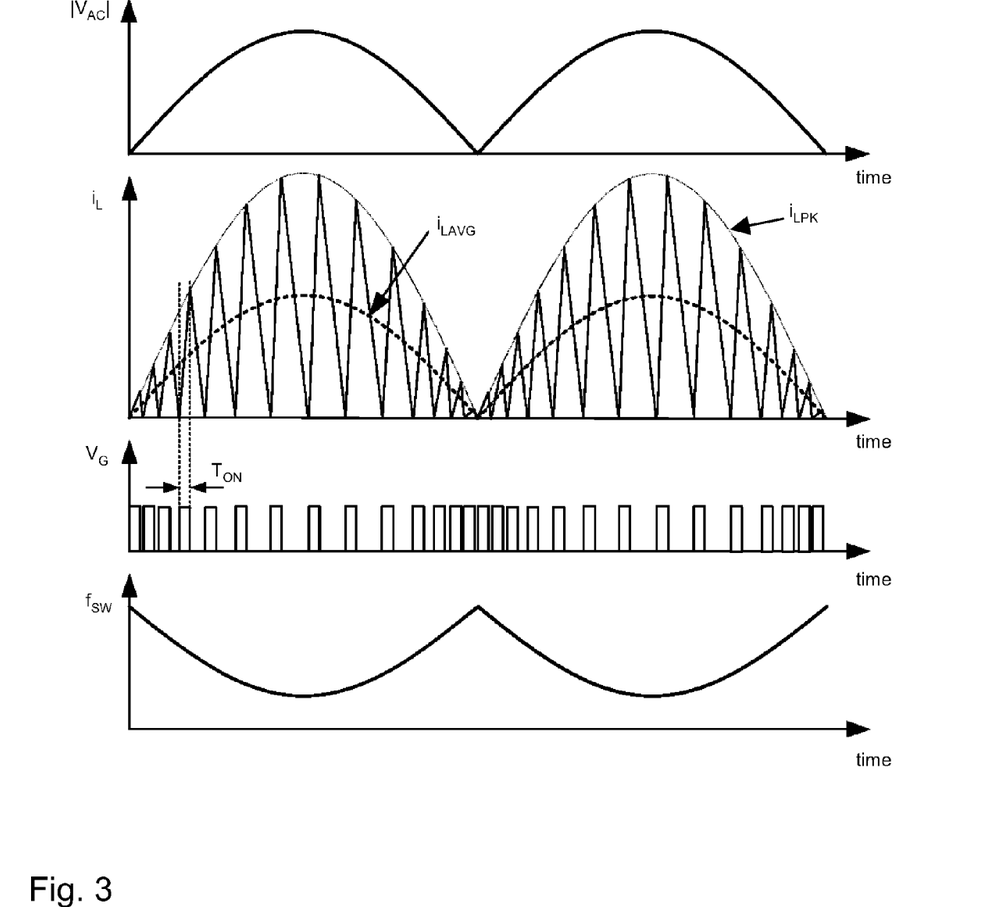
FIG. 3 includes timing diagrams illustrating the function of the power factor control circuit over one cycle of the sinusoidal AC line voltage.

Generally, the N-th local minimum could be selected, wherein N is an integer number equal to or greater than one. A local minimum of the voltage $V_{DS}$ is also referred to as "quasi-resonant" switch-on condition. Quasi-resonant switching reduces the switching losses. It is known to set N equal to 1. In this case, the DCM is sometimes also referred to as critical conduction mode (CrCM) or boundary conduction mode (BCM). Thus BCM (or CrCM) may be regarded as special case of DCM. During quasi-resonant DCM operation the on-time $T_{ON}$ (i.e. the time instant at which the semiconductor switch $Q_{PFC}$ is switched off) may be regulated. For PFC circuits it is known to set the on-time $T_{ON}$ to a constant value. This situation is illustrated in the timing diagrams of FIG. 3. FIG. 3 includes four timing diagrams illustrating the rectified AC line voltage $|V_{AC}|=v_G$ (input voltage to the PFC stage), the inductor current $i_L$ as well as its peak envelope and its short time average (cycle-by-cycle average) $i_{LAVG}$, the corresponding drive signal composed of pulses having constant pulse length (equaling the on-time $T_{ON}$), and the corresponding instantaneous switching frequency $f_{SW}$.

The waveforms illustrated in FIG. 3 are valid for quasi-resonant switching with N=1, i.e., the semiconductor switch $Q_{PFC}$ is switched on at the time instant, at which the first local minimum in the voltage $V_{DS}$ across the semiconductor switch $Q_{PFC}$ occurs. Using such a switching scheme (constant on-time TON, quasi-resonant DCM operation with N=1) yields a good PFC performance of the circuit. As can be seen from FIG. 3 (second timing diagram from the top) the cycle-by-cycle average $i_{LAVG}$ of the inductor current $i_L$ is proportional to and in-phase with the input voltage $v_G$ and the AC line voltage $V_{AC}$. Therefore, a power factor close to unity may be achieved with such a switching scheme.

The cycle-by-cycle average of the inductor current is a signal including subsequent averages of the inductor current, each average being calculated for each individual cycle. Using the switching scheme described above with reference to FIG. 3 provides a good power factor. However, in SMPSs which have to operate properly for input voltages within a relatively wide voltage range and for loads that may vary within a relatively wide range, the switching frequency may, as a result, also vary within a wide range and assume, dependent on the input voltage $v_G$ and the load comparably high or low values.

Particularly, high switching frequencies are undesired in many applications, e.g., to avoid electromagnetic interferences and high switching losses leading to reduced efficiency. Therefore, more sophisticated switching schemes would be useful to keep the switching frequency within a narrower range without limiting the ranges for the input voltage or the load.

In order to achieve a high power factor the cycle-by-cycle average of the input current $i_L$ (equaling the inductor current in the present example which uses a boost converter topology) has to be proportional to and in phase with the input voltage $v_G$. If this is the case then the AC input current $i_{AC}$ (see FIG. 1) will also be proportional to and in-phase with the AC line voltage $V_{AC}$. The average inductor current $i_{LAVG}$ averaged over one switching period $T_{SW}$ can be calculated as follows:

$$i_{LAVG} = \langle i_L \rangle_{T_{SW}} = \frac{1}{2} i_{LPK} \frac{T_{ON}+T_L}{T_{SW}} = \left( \frac{T_{ON}^2}{2 \cdot L_{PFC} \cdot T_{SW}} \cdot \frac{v_O}{v_O - v_G} \right) v_G \qquad (1)$$

The average inductor current $i_{LAVG}$ is proportional to (and in-phase with) the input voltage $v_G$ if the expression:

$$\left( \frac{T_{ON}^2}{2 \cdot L_{PFC} \cdot T_{SW}} \cdot \frac{v_O}{v_O - v_G} \right)$$

is constant. As the inductance $L_{PFC}$ is constant, it is sufficient to maintain the expression $$\left( \frac{T_{ON}^2}{T_{SW}} \cdot \frac{v_O}{v_O - v_G} \right) = T_{CTL} \qquad (2)$$

at a constant level. The value $T_{CTL}$ is provided at the output of a voltage controller (will be explained later) which has bandwidth of 5-20 Hz and thus the value $T_{CTL}$ will be substantially constant throughout one half-cycle of the AC line voltage $V_{AC}$. From equation (2) it follows that $$T_{ON} = \sqrt{T_{CTL} \cdot T_{SW} \cdot \left(1 - \frac{v_G}{v_O}\right)}. \qquad (3)$$

As shown, the on-time $T_{ON}$ can be calculated from the value $T_{CTL}$ (which is substantially constant throughout one half cycle of the AC line voltage), the current switching period $T_{SW}=f_{SW}^{-1}$, the input voltage $v_G$, and the output voltage $v_O$. The on-time is thus variable and can be determined in accordance with equation (3) to obtain a high power factor.

The above equation (3) is, however, only valid for DCM operation using a constant switching frequency $f_{SW}=T_{SW}^{-1}$. When using a quasi-resonant switching scheme, the switching period $T_{SW}$ has to be replaced by $T_{ON}+T_L+T_D$ (see FIG. 2), wherein $T_D$ is a constant delay time depending on parameters of the circuit components used in the PFC circuit and the valley number N. Substituting $T_{SW}$ with $T_{ON}+T_L+T_D$ in equation (1) yields:

$$i_{LAVG} = \langle i_L \rangle_{T_{SW}} = \frac{v_G}{2 \cdot L_{PFC}} \frac{T_{ON}}{1 + \frac{T_D}{T_{ON}} \cdot \frac{v_O - v_G}{v_O}}. \qquad (4)$$

Proportionality between the input voltage $v_G$ and the average inductor current $i_L$ is achieved if the following expression is maintained constant:

$$\frac{T_{ON}}{1 + \frac{T_D}{T_{ON}} \cdot \frac{v_O - v_G}{v_O}} = T'_{CTL}. \tag{5}$$

Similar as above (cf. equation (3)) the on-time can be calculated as $$T_{ON} = \frac{T'_{CTL}}{2} \left[ 1 + \sqrt{1 + \frac{4 \cdot T_D}{T'_{CTL}} \cdot \left(1 - \frac{v_G}{v_O}\right)} \right]. \tag{6}$$

That is, in DCM operation with a constant switching frequency the on-time $T_{ON}$ can be calculated in accordance with equation (3), whereas in quasi-resonant DCM operation, the on-time can be calculated in accordance with equation (6). In quasi-resonant DCM operation the delay time $T_D$ is constant and may be expressed as:

$$T_D = (N - 0.5) \cdot T_R, \tag{7}$$

wherein N is the number of the local minimum at which the semiconductor switch is switched on (N=2 in the example of FIG. 2) and $T_R$ is the period of the resonant oscillation (oscillation frequency $f_R = T_R^{-1}$) of the oscillating voltage $V_{DS}$ (see FIG. 2).

As can be seen from the equations (3) and (6) only the input voltage $v_G$ and the output voltage $v_O$ are needed to be sensed in order to be able to calculate the on-time $T_{ON}$ during one half-cycle of the AC line voltage. All other parameters ($T_D$ or $T_{SW}$) are constant and $T_{CTL}'$ and, respectively, $T_{CTL}$ are internal control parameters generated within the controller circuit 4 (see FIG. 1). No current sensing and zero current detection is required, and thus the losses in the passive circuit components usually needed in the current sense circuit are reduced.

The calculation of the on-time may be numerically challenging. Instead of directly calculating the on-time, an iterative calculation may be used:

$$T_{ON}(n+1) = T_{ON}(n) + f(T_{CTL}', T_D, v_G, v_O), \tag{8}$$

where $f(\bullet)$ denotes a rational or a linear function that provides a suitable iteration step, e.g., derived by $1^{st}$ order Taylor approximation.

Instead of the voltage data $v_G$, $v_O$ the timing parameter $T_{ON}$ and $T_L$ may be used in accordance with $$1 - \frac{v_G}{v_O} = \frac{T_{ON}}{T_{ON} + T_L}, \tag{9}$$

and thus $$T_{ON}(n+1) = T_{ON}(n) + f(T_{CTL}', T_D, T_{ON}(n), T_L(n)). \tag{10}$$

This iterative calculation can also be implemented as an inner feedback control loop minimizing the difference:

$$E_{CTL} = \left(\frac{T_{ON}^2}{T_{SW}} \cdot \frac{v_O}{v_O - v_G}\right) - T_{CTL} = \left(\frac{T_{ON} \cdot (T_{ON} + T_L)}{T_{SW}}\right) - T_{CTL}, \tag{11}$$

or minimizing $$\tilde{E}_{CTL} = \left(T_{ON}^2 \cdot \frac{v_O}{v_O - v_G}\right) - T_{CTL} \cdot T_{SW} = T_{ON} \cdot (T_{ON} + T_L) - T_{CTL} \cdot T_{SW} \tag{12}$$

The feedback control may be implemented as PI-controller according to:

$$T_{ON}(n+1) = T_{ON}(n) + K_I \cdot E_{CTL}(n) + K_P \cdot [E_{CTL}(n) - E_{CTL}(n-1)] \tag{13}$$

Of course, $E_{CTL}$ may be replaced by $\tilde{E}_{CTL}$ and PI-control may be replaced by other controller types.

Figure 4:
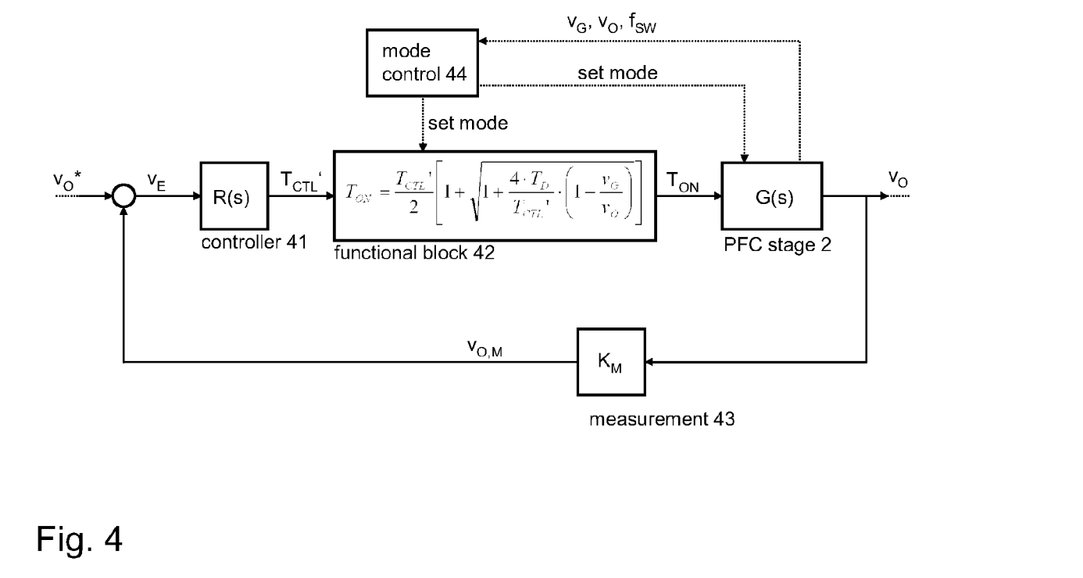
FIG. 4 illustrates the system model of one embodiment of the invention, including power stage and controller.

As discussed above, the control parameters $T_{CTL}$ and $T_{CTL}'$ introduced herein should be approximately constant in order to ensure a proper power factor correction. Nevertheless, the absolute level of the control parameters $T_{CTL}$ and $T_{CTL}'$, respectively, determines the electrical input power of the PFC stage 2. Particularly, the amplitude of the AC input current $i_{AC}$ is proportional to the control parameter $T_{CTL}$ (or $T_{CTL}'$). Therefore, the output voltage $v_O$ may be regulated by "tuning" the control parameter $T_{CTL}$ (or $T_{CTL}'$) to an appropriate level. FIG. 4 illustrates the structure of the voltage control loop implemented in the controller 4 (see FIG. 1) to regulate the output voltage $v_O$ of the PFC stage 2.

In FIG. 4 the variable "s" denotes the Laplace variable in the frequency domain, and G(s) denotes the complex transfer function of the PFC stage 2 (G(s)=$v_O$(s)/$T_{ON}$(s)). The transfer function G(s) characterizes the frequency response of the PFC stage 2, that is the ratio of output voltage $v_O$ and on time $T_{ON}$. For the purpose of voltage control, the on-time $T_{ON}$ is regarded as input signal to the PFC stage 2.

The PFC stage 2 may be modeled in various ways. One possibility is to approximate the system behavior (i.e., the transfer function G(s)) of the PFC stage 2 as follows:

$$G(s) = K_G \frac{1 + sRC}{sC}, \tag{14}$$

wherein the parameter $K_G$, R and C are gain, resistance and capacitance values characterizing the PFC stage 2. These parameters may be obtained, by simulation (system identification), by experiment or by theoretic considerations. The model actually used for the controller design is not crucial for the present invention and thus not further discussed herein.

In FIG. 4, the functional block 42 represents the on-time calculation which is done in accordance with equation 3 or 6 (dependent on whether a constant switching frequency or a quasi-resonant operation is used). The functional block 42 receives the control parameter $T_{CTL}$ or $T_{CTL}'$ and is configured to calculate the corresponding on-time $T_{ON}$ as discussed in great detail above. As can be seen from FIG. 4, the functional block 42 is connected upstream to the system G(s) representing the PFC stage 2 and provides the calculated on-time $T_{ON}$ (as input signal) to the PFC stage 2.

The control loop depicted in FIG. 4 further includes a controller 41 which may be, for example, a PI or PID controller (PI controller=proportional-integral controller; PID controller=proportional-integral-derivative controller). The controller 41 is characterized by the transfer function R(s), the variable "s" being the Laplace variable. The controller 41 may be designed in accordance with any suitable controller design method that is known in the field of control engineering. Generally, the controller 41 receives an error signal $v_E$ which represents the difference between a desired output voltage $v_O^*$ and the output voltage $V_{O,M}$ actually measured ($v_E = v_O^* - v_{O,M}$).

The functional block 43 represents the voltage measurement. It receives the output voltage $v_O$ and is configured to provide a measured signal $v_{O,M}$ representing the actual output voltage signal $v_O$. Ideally, the transfer function $K_M$ of the measurement set-up is a real function and, in the present example, $K_M=1$. As already mentioned above, the controller 41 has a low upper cut-off frequency between, e.g., 5 and 20 Hz, so that the control parameter $T_{CTL}$ or $T_{CTL}'$ is approximately constant during one half period of the AC input voltage.

The example of FIG. 4 further includes a mode controller 44 which may be regarded as part of the controller 4 (see FIG. 1). The mode of operation is chosen by the mode controller 44 dependent on at least one of the following: the AC input voltage $V_{AC}$, the input voltage $v_G$ supplied to the PFC stage 2, the output voltage $v_O$ of the PFC stage 2, the output current provided by the PFC stage 2, and the input or the output power of the PFC stage 2. In accordance with the embodiment described herein the following modes of operation are available:
- discontinuous current mode (DCM) with constant switching frequency;
- DCM with quasi-resonant switching at the first minimum (QR-1 mode);
- DCM with quasi-resonant switching at the second minimum (QR-2 mode);
- DCM with quasi-resonant switching at the $N^{th}$ minimum (QR-N mode), etc.

Quasi-resonant switching has been discussed above with reference to FIG. 2. The example of FIG. 2 illustrates switching at the second local minimum occurring in voltage $V_{DS}$ across the semiconductor switch $Q_{PFC}$ after the time instant $t_0$ at which the current through the switch $Q_{PFC}$ reached zero.

Generally, the switching frequency $f_{SW} = T_{SW}^{-1}$ is reduced when switching from the QR-N mode to the QR-(N+1) mode as the dead time $T_D$ (see FIG. 2) becomes longer. As the amplitude of the oscillation of the voltage signal $V_{DS}$ is gradually decaying after time instant $t_0$ (see FIG. 2) only a few local minima can be detected, say, e.g., the first five local minima. In this case only five quasi-resonant modes are available (that is QR-1, QR-2, QR-3, QR-4, and QR-5). To further reduce the switching frequency, DCM is used with a fixed switching frequency $f_{SW}$ that is lower than the effective switching frequency in the QR-5 mode. It should be noted that, dependent on the actual implementation fewer or more quasi-resonant modes may be available.

Generally, the operating mode with the most suitable switching frequency range should be selected. One possibility is defining a minimum and a maximum switching frequency. The operating mode is changed to a mode with a lower maximum switching frequency, if the current maximum switching frequency is too high. Moreover, it is changed to a mode with a higher minimum switching frequency if the current minimum switching frequency is too low. Rules for minimum and maximum switching frequency may be given by audible noise and switching losses and the limits may be a function of the line voltage and the load.

Another possibility is defining one frequency that characterizes the switching frequency range, e.g., the average switching frequency, or the middle of the switching frequency range, or the switching frequency at a certain phase of the AC line voltage. The operating mode with the characteristic frequency that is closest to the desired characteristic frequency is chosen. The desired characteristic frequency may be given by similar criteria like audible noise, EMI, and/or efficiency, and may be a function of the line voltage and the load. Moreover, the on-time of the MOSFET $Q_{PFC}$ or the inductor peak current can be used as criterion for operating mode selection.

Although various exemplary embodiments of the invention have been disclosed, it will be apparent to those skilled in the art that various changes and modifications can be made that will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those where not explicitly been mentioned. Furthermore, the methods of the invention may be achieved in either all software implementations using the appropriate processor instructions or in hybrid implementations that utilize a combination of hardware logic and software logic to achieve the same results. Such modifications to the inventive concept are intended to be covered by the appended claims.

What is claimed is:

1. A power factor correction (PFC) circuit comprising:
a first inductor operably supplied with an input voltage and an input current, the input voltage being a rectified AC line voltage;
a semiconductor switch having a load current path coupled in series with the first inductor;
an output terminal coupled to the first inductor and operably providing an output voltage and an output current; and
a controller circuit to control a cyclic switching operation of the semiconductor switch, the controller circuit configured to:
monitor a feedback signal representing a voltage drop across the load current path of the semiconductor switch;
detect at least one local minimum in the feedback signal while the semiconductor switch is off;
switch on the semiconductor switch in response to detecting an N-th local minimum in the feedback signal, wherein N is an integer number equal to or greater than 1 and determined dependent on at least one of the following: the input voltage, the output voltage, and the output current; and
switch off the semiconductor switch after an on-time has elapsed, wherein the on-time depends on N and is adjusted, in each switching cycle, such that a cycle-by-cycle average of the input current is proportional and in-phase with the input voltage.

2. The PFC circuit of claim 1 further comprising a diode that is configured to take over the output current during time periods in which the semiconductor switch is in a switched-off state.

3. The PFC circuit of claim 2, wherein the diode is coupled between the output terminal and a common circuit node shared by the first inductor and the semiconductor switch.

4. The PFC circuit of claim 1 further comprising a capacitor coupled to the output terminal.

5. The PFC circuit of claim 1, wherein the controller circuit is further configured to operate in at least one quasiresonant mode and at least in one further mode,
wherein, in the at least one quasiresonant mode, the controller controls the cyclic switching operation of the semiconductor switch using a specific value for N associated with the at least one quasiresonant mode, and wherein, in the at least one further mode, the controller controls the cyclic switching operation of the semiconductor switch using a constant cycle period and an adjustable on-time irrespective any local minima in the feedback signal.

6. The PFC circuit of claim 5, wherein at least one quasiresonant mode is associated with a switching frequency range and a mode switch criterion and wherein the controller circuit is further configured to switch to another one of the quasiresonant mode and the at least one further modes, when the switching frequency complies with the mode switch criterion.

7. The PFC circuit of claim 5,
wherein at least one quasiresonant mode is associated with an average switching frequency, a lower frequency threshold and an upper frequency threshold,
wherein the controller circuit is further configured to switch to another one of the quasiresonant mode and the at least one further modes, which have a lower average switching frequency, when the average switching frequency exceeds the upper frequency threshold, and
wherein the controller circuit is further configured to switch to another one of the quasiresonant mode and the at least one further modes, which have a higher average switching frequency, when the average switching frequency falls below the lower frequency threshold.

8. The PFC circuit of claim 5,
wherein at least one quasiresonant mode is associated with a minimum and a maximum switching frequency, a lower frequency threshold and an upper frequency threshold;
wherein the controller circuit is further configured to switch to another one of the quasiresonant mode and the at least one further modes, which have a lower maximum switching frequency, when the maximum switching frequency exceeds the upper frequency threshold; and
wherein the controller circuit is further configured to switch to another one of the quasiresonant mode and the at least one further modes, which have a higher minimum switching frequency, when the minimum switching frequency falls below the lower frequency threshold.

9. The PFC circuit of claim 1, wherein the controller circuit is further configured to control, in each switching cycle, the on-time such that a cycle-by-cycle average of the input current is proportional and in-phase with the input voltage.

10. The PFC circuit of claim 1, wherein the controller circuit is further configured to provide a control parameter from which, in each switching cycle, the on-time is calculated.

11. The PFC circuit of claim 10, wherein the control parameter is approximately constant during a period of the input voltage being a rectified AC line voltage.

12. The PFC circuit of claim 11, wherein the control parameter is be adjusted from such that the output voltage matches a desired output voltage level.

13. The PFC circuit of claim 11, wherein the control parameter may be adjusted from period to period of the input voltage thereby adjusting the output voltage.

14. A power factor correction method using a PFC circuit that comprises:
a first inductor operably supplied with an input voltage and an input current, the input voltage being a rectified AC line voltage;
a semiconductor switch having a load current path coupled in series with the first inductor; and
an output terminal coupled to the first inductor and operably providing an output voltage and an output current;
wherein the method comprises:
monitoring a feedback signal representing a voltage drop across the load current path of the semiconductor switch;
detecting at least one local minimum in the feedback signal while the semiconductor switch is off;
switching on the semiconductor switch in response to detecting an N-th local minimum in the feedback signal, wherein N is an integer number equal to or greater than 1 and determined dependent on at least one of the following: the input voltage, the output voltage, and the output current; and
switching off the semiconductor switch after an on-time has elapsed, wherein the on-time depends on N and is adjusted, in each switching cycle, such that a cycle-by-cycle average of the input current is proportional and in-phase with the input voltage.

15. The PFC circuit of claim 1,
wherein the controller circuit is further configured to operate in different modes including at least in two quasiresonant modes, each quasiresonant mode being associated with a specific value of N and N being different for each quasiresonant mode.

16. The PFC circuit of claim 15,
wherein each quasiresonant mode is associated with a switching frequency range and at least one mode switch criterion, and
wherein the controller circuit is further configured to switch to another one of the different modes, when the switching frequency complies with at least one mode switch criterion.

17. The PFC circuit of claim 16,
wherein the at least one mode switch criterion includes at least one of: a switching frequency of the PFC circuit falls below a minimum switching frequency associated with a current one of the different modes, a switching frequency of the PFC circuit exceeds a maximum switching frequency associated with the current one of the different modes.

18. The PFC circuit of claim 10 wherein, in each switching cycle, the on-time is directly calculated from the control parameter.

19. The PFC circuit of claim 10 wherein the controller circuit provides the control parameter with a cut-off frequency so low that the control parameter is approximately constant during one half-period of the rectified AC line voltage.

20. The PFC circuit of claim 10 wherein, in Discontinuous Current Mode and for each switching cycle, the on-time is calculated from the control parameter based on:

$$T_{ON} = \frac{T'_{CTL}}{2}\left[1 + \sqrt{1 + \frac{4 \cdot T_D}{T'_{CTL}} \cdot \left(1 - \frac{v_G}{v_O}\right)}\right],$$

wherein $T_{ON}$ is the on-time, $T_{CTL}'$ is the control parameter, $T_D$ is a delay time depending on N, $v_O$ is the output voltage, and $v_G$ is the input voltage.

21. The PFC circuit of claim 10 wherein, in Discontinuous Current Mode and for each switching cycle, the on-time is calculated from the control parameter based on:

$$i_{LAVG} = \frac{1}{2} i_{LPK} \frac{T_{ON} + T_L}{T_{SW}} = \left( \frac{T_{ON}^2}{2 \cdot L_{PFC} \cdot T_{SW}} \cdot \frac{v_O}{v_O - v_G} \right) v_G,$$

wherein $T_{ON}$ is the on-time, $T_L$ is a fall time of an inductor current passing through the first inductor, $T_{SW}$ switching time period, $L_{PFC}$, is an inductance of the first inductor, $v_O$ the output voltage, and $v_G$ the input voltage, $i_{LPK}$ is a peak inductor current and $i_{LAVG}$ is a cycle-to-cycle average of an inductor current passing through the first inductor.

22. The PFC circuit of claim 21 wherein the on-time is calculated iteratively based on $$T_{ON}(n+1) = T_{ON}(n) + f(T_{CTL}', T_D, v_G, v_O),$$

wherein n is a time index and $f(T_{CTL}', T_D, v_G, v_O)$ generally denotes a function of the control parameter $T_{CTL}'$, a delay time $T_D$, the input voltage $v_G$ and the output voltage $v_O$.

23. The PFC circuit of claim 21 wherein the on-time is calculated iteratively based on $$T_{ON}(n+1) = T_{ON}(n) + f(T_{CTL}', T_D, T_{ON}(n), T_L(n)),$$

wherein n is a time index and $f(T_{CTL}', T_D, T_{ON}(n), T_L(n))$ generally denotes a function of the control parameter $T_{CTL}'$, a delay time $T_D$, the on-time $T_{ON}$ and the fall time $T_L$ of the inductor current passing through the first inductor.

24. The PFC circuit of claim 16 wherein the other one of the different modes uses a constant cycle period $T_{SW}$ and the on-time is calculated based on:

$$T_{ON} = \sqrt{T_{CTL} \cdot T_{SW} \cdot \left(1 - \frac{v_G}{v_O}\right)},$$

wherein $T_{ON}$ is the on-time, $T_{CTL}$ is a control parameter, $v_O$ the output voltage, and $v_G$ the input voltage.

* * * * *

UNITED STATES PATENT AND TRADEMARK OFFICE
CERTIFICATE OF CORRECTION

PATENT NO. : 9,455,623 B2  
APPLICATION NO. : 13/970414  
DATED : September 27, 2016  
INVENTOR(S) : Fan et al.

Page 1 of 1

It is certified that error appears in the above-identified patent and that said Letters Patent is hereby corrected as shown below:

In the Claims

In Column 12, Line 62 – 67, Claim 20, delete the equation and insert $$T_{ON} = \frac{T_{CTL}{'}}{2}\left[1 + \sqrt{1 + \frac{4 \cdot T_D}{T_{CTL}{'}} \cdot \left(1 - \frac{v_G}{v_O}\right)}\right]$$

-- , --.

Signed and Sealed this  
Second Day of May, 2017

Michelle K. Lee  
*Director of the United States Patent and Trademark Office*